(12) United States Patent
Brent et al.

(10) Patent No.: US 7,930,102 B2
(45) Date of Patent: Apr. 19, 2011

(54) SYSTEMS AND METHODS FOR CONSTRUCTING VARIABLE OFFSET PATHS

(75) Inventors: Donald E. Brent, Phoneix, AZ (US); James K. Haberstock, Phoenix, AZ (US); David L Haugen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/359,758

(22) Filed: Jan. 26, 2009

(65) Prior Publication Data

US 2009/0132157 A1 May 21, 2009

Related U.S. Application Data

(62) Division of application No. 11/700,272, filed on Jan. 31, 2007, now Pat. No. 7,483,790.

(51) Int. Cl.
G08G 5/04 (2006.01)
(52) U.S. Cl. .............................. 701/301; 701/3; 701/122
(58) Field of Classification Search .................... 701/301
See application file for complete search history.

(56) References Cited

U.S. PATENT DOCUMENTS

| | | | |
|---|---|---|---|
| 4,999,782 A | 3/1991 | BeVan | |
| 5,631,640 A | 5/1997 | Deis et al. | |
| 5,646,854 A | 7/1997 | Bevan | |
| 6,181,987 B1 | 1/2001 | Deker et al. | |
| 6,269,301 B1 | 7/2001 | Deker | |
| 6,314,349 B1 | 11/2001 | Tomasi et al. | |
| 6,405,124 B1 * | 6/2002 | Hutton | 701/200 |
| 6,424,889 B1 | 7/2002 | Bonhoure et al. | |
| 6,529,821 B2 | 3/2003 | Tomasi et al. | |
| 7,089,091 B2 | 8/2006 | Artini et al. | |
| 2005/0261808 A1 | 11/2005 | Artini et al. | |

FOREIGN PATENT DOCUMENTS

WO 2005012837 A1 2/2005

OTHER PUBLICATIONS

EP Search Report, 08101013.4 dated Jun. 9, 2008.

* cited by examiner

*Primary Examiner* — Thomas G Black
*Assistant Examiner* — Shelley Chen
(74) *Attorney, Agent, or Firm* — Ingrassia Fisher & Lorenz, P.C.

(57) ABSTRACT

A method is provided for constructing an offset, and includes constructing the capture path, which includes selecting a capture path start point on a first leg of the flight path and selecting a first capture path angle; determining whether a first capture path segment extending from the capture path start point at the first capture path angle intersects a) a first bisector or b) a first bisector backcourse; establishing, if the first capture path segment intersects the first bisector backcourse, the first capture path segment as the capture path; establishing, if the first capture path segment intersects the first bisector, the intersection as a first point; determining one or more subsequent capture path segments until the one or more subsequent capture path segments intersect a subsequent bisector; and establishing the first capture path segment and the one or more subsequent capture path segments as the capture path.

19 Claims, 17 Drawing Sheets

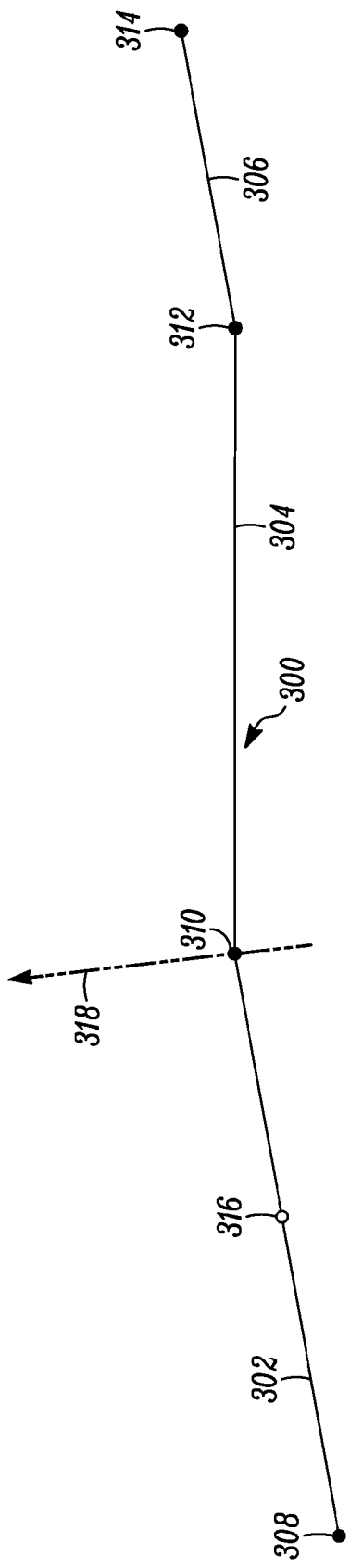
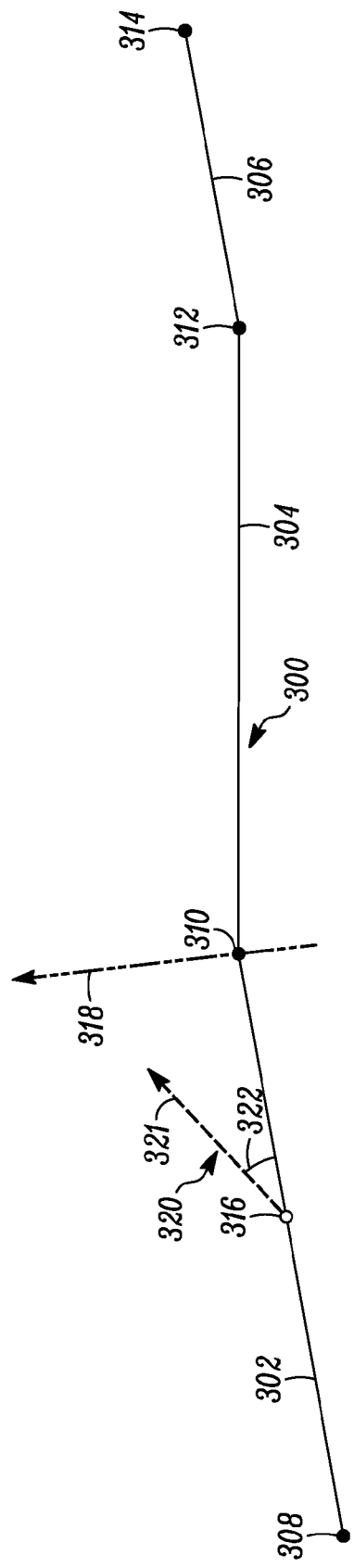
FIG. 4
FIG. 5

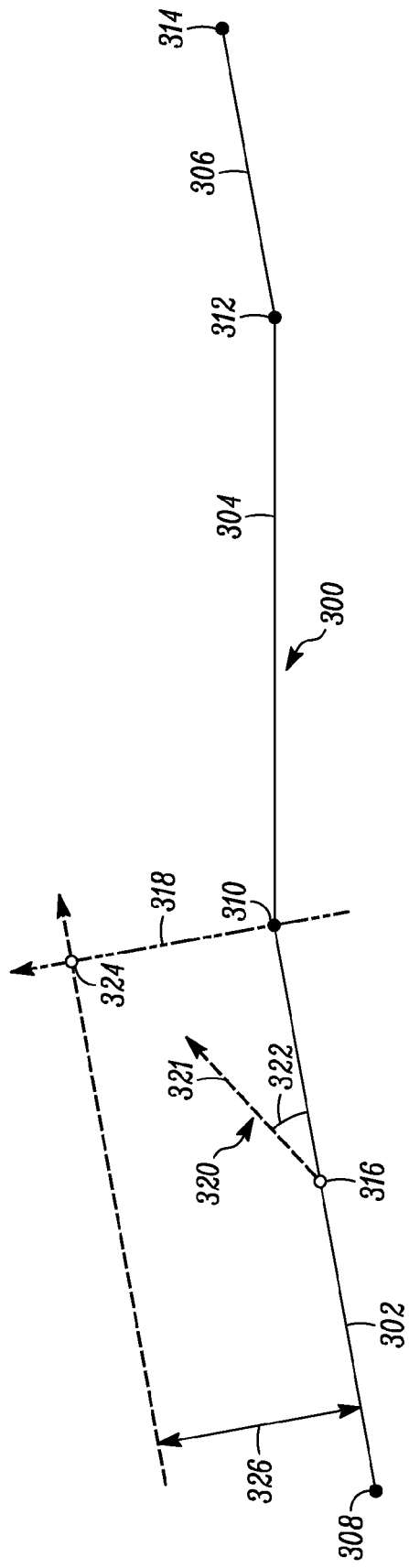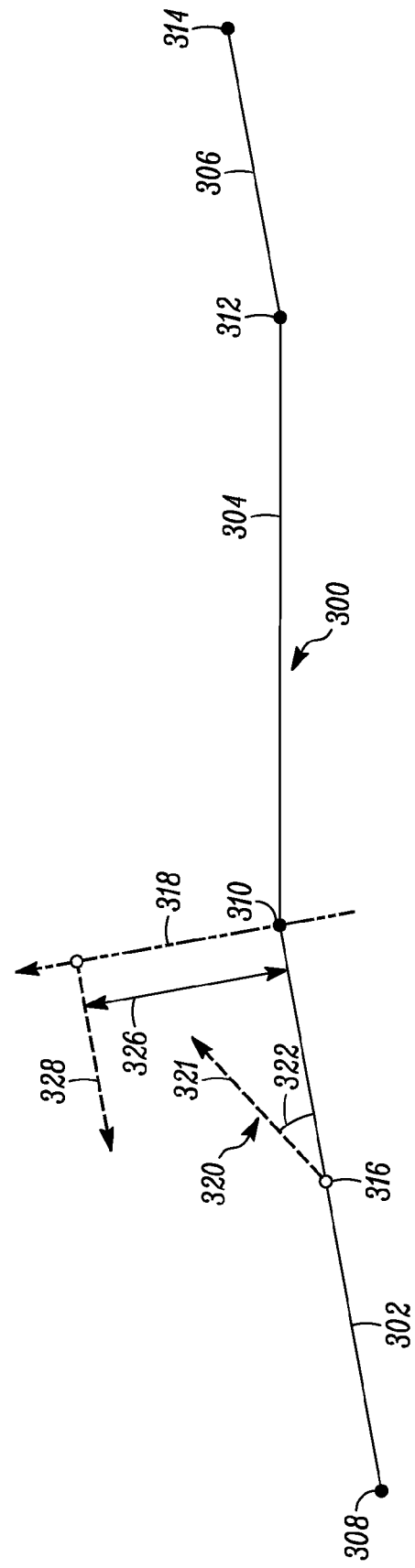

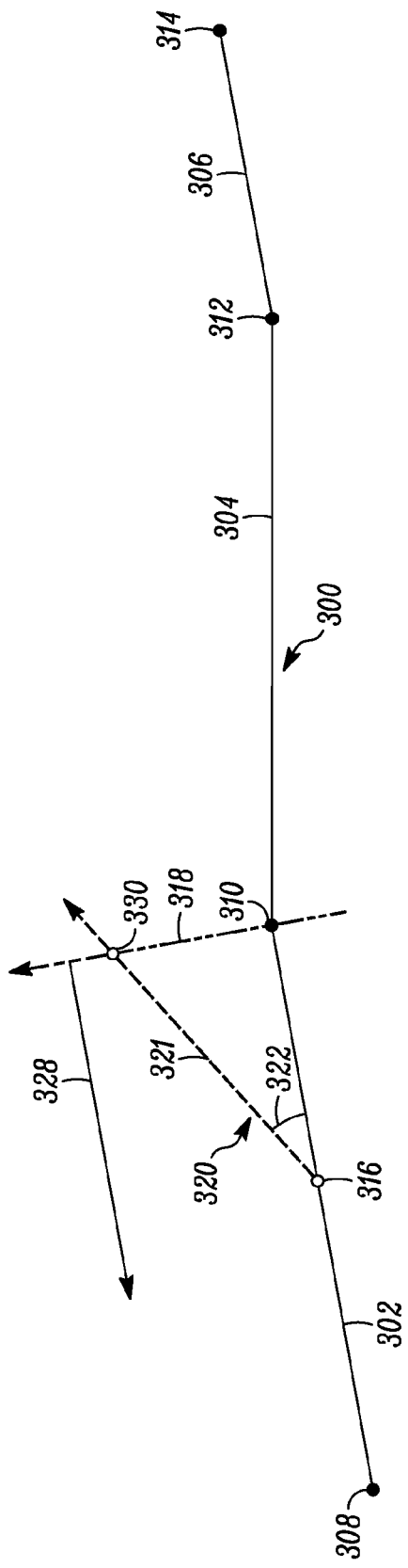
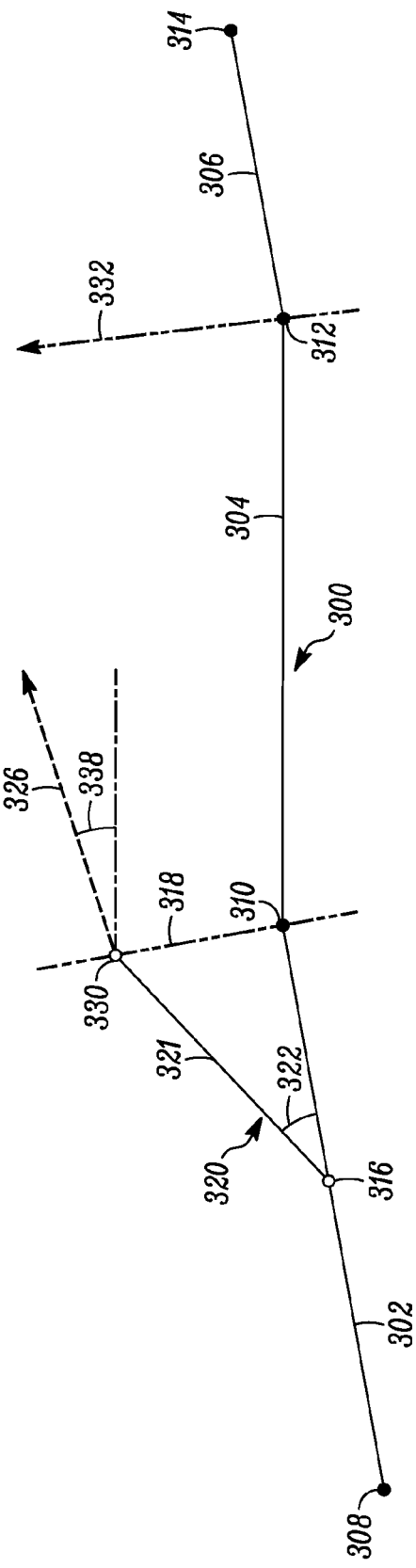
FIG. 8
FIG. 9

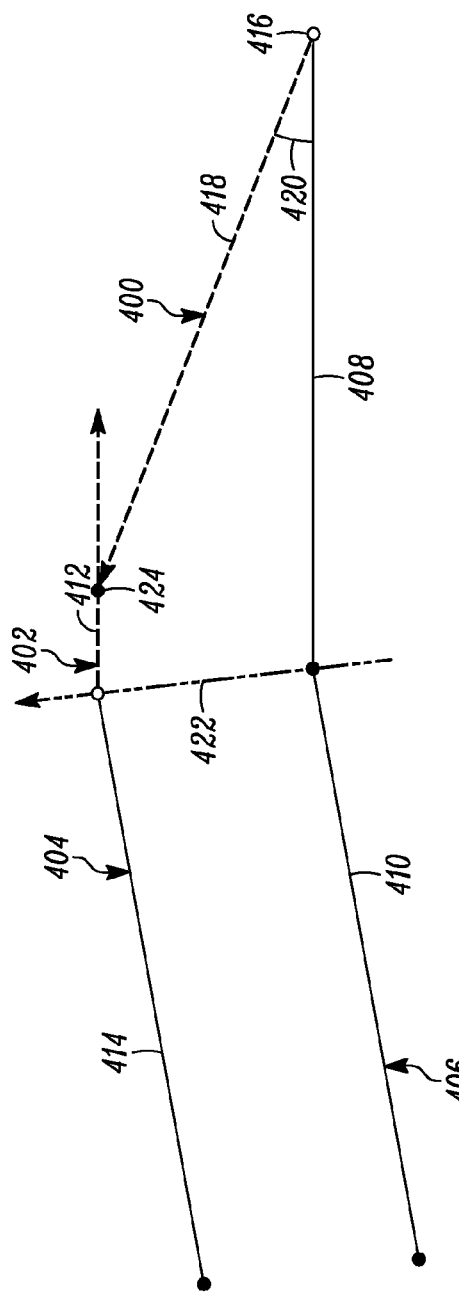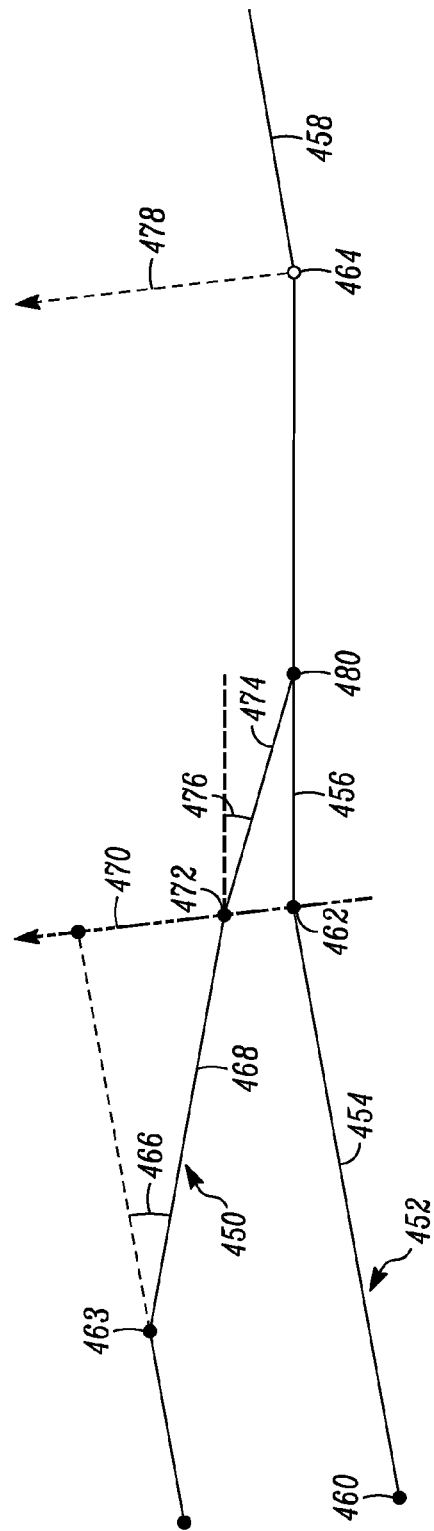
FIG. 12
FIG. 13

SYSTEMS AND METHODS FOR CONSTRUCTING VARIABLE OFFSET PATHS

PRIORITY CLAIMS

This is a divisional application of U.S. application Ser. No. 11/700,272, filed Jan. 31, 2007.

FIELD OF THE INVENTION

The present invention generally relates to systems and methods for constructing offsets for aircraft, and more particularly relates to systems and methods for constructing offset for aircraft with variable angles.

BACKGROUND OF THE INVENTION

In a modern commercial aircraft, a flight crew makes flight plan entries and modifications through a Flight Management System (FMS). The FMS receives inputs related to the desired destination, and the FMS builds a flight plan based on the inputs. Referring to FIG. 1, an offset 100 is a modification to a flight plan 102 in which a parallel flight path is constructed at a given offset distance 103 either to the left or the right of the flight plan 102. Offsets 100 are primarily used by aircraft 126 to avoid terrain obstacles or weather 104. In the example shown in FIG. 1, the flight plan 102 includes five legs 106, 108, 110, 112, and 114 that connect five waypoints 116, 118, 120, 122, and 124. The offset 100 begins at a present position (PPOS) 128 and includes a capture path 130, a parallel path 132, and a return path 134. The capture path 130 extends from the flight plan 102 to the full offset distance 103. The parallel path 132 tracks the flight plan 102 at the full offset distance 103. The return path 134 extends from the parallel path 132 back to the flight plan 102. The offset 100 has a capture angle 136 and a return angle 138 of 45° with respect to the flight plan 102. The capture angle 136 and return angle 138 are fixed at 45°. This can result in an inefficient offset and/or an offset that is subject to little or no pilot modification. Moreover, the capture path 130 and return path 134 must occur within the bounds of a single leg, only include a single segment at the fixed capture and return angles 136 and 138, and are unable to traverse multiple legs, large course changes, and non-intersecting legs.

Accordingly, it is desirable to provide methods and systems for constructing offsets from flight plans that minimize deviation from original flight plan and increases the efficiency of the offset. Moreover, it is desirable to provide methods and systems for constructing offsets from flight plans that enable pilot modifications, including variable capture and return angles. Additionally, it is desirable to provide systems and methods for constructing offsets from flight plans that traverse multiple legs, non-intersecting legs, and large course changes. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one exemplary embodiment, a method is provided for constructing an offset with a capture path, a parallel path at an offset distance from a flight plan, and a return path, the flight plan having a plurality of legs and plurality of waypoints. The method includes the step of constructing the capture path, which includes selecting a capture path start point on a first leg of the flight path and selecting a first capture path angle from the first leg; determining whether a first capture path segment extending from the capture path start point on the first leg at the first capture path angle intersects a) a first bisector extending from a first waypoint between the first leg and a second leg or b) a first bisector backcourse extending from the first bisector parallel to the first leg at the offset distance; establishing, if the first capture path segment intersects the first bisector backcourse, the first capture path segment as the capture path; establishing, if the first capture path segment intersects the first bisector, the intersection as a first point; determining one or more subsequent capture path segments until the one or more subsequent capture path segments intersect a subsequent bisector instead of a subsequent bisector backcourse; and establishing the first capture path segment and the one or more subsequent capture path segments as the capture path. The method further includes constructing the parallel path from the capture path and constructing the return path from the parallel path to the flight plan.

In another exemplary embodiment, a system is provided for constructing an offset at an offset distance from a flight plan with a plurality of legs and a plurality of waypoints. The system includes an input device configured to receive inputs related to a capture path angle and a capture path start point from a pilot; a memory coupled to the input device and configured to store data related to the flight plan and the offset; and a processor configured to retrieve data from the memory and to construct the offset based on the capture path angle and the capture path start point.

BRIEF DESCRIPTION OF THE DRAWINGS

The present invention will hereinafter be described in conjunction with the following drawing figures, wherein like numerals denote like elements, and wherein:

FIGS. 4-11 are illustrations demonstrating the construction of a capture path for an offset from a flight plan in accordance with an exemplary embodiment of the present invention;

FIG. 12 is an illustration demonstrating the construction of a return path for an offset from a flight plan in accordance with an exemplary embodiment of the present invention;

FIG. 13 is an illustration demonstrating the construction of a return path for an offset from a flight plan in accordance with another exemplary embodiment of the present invention;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 2:
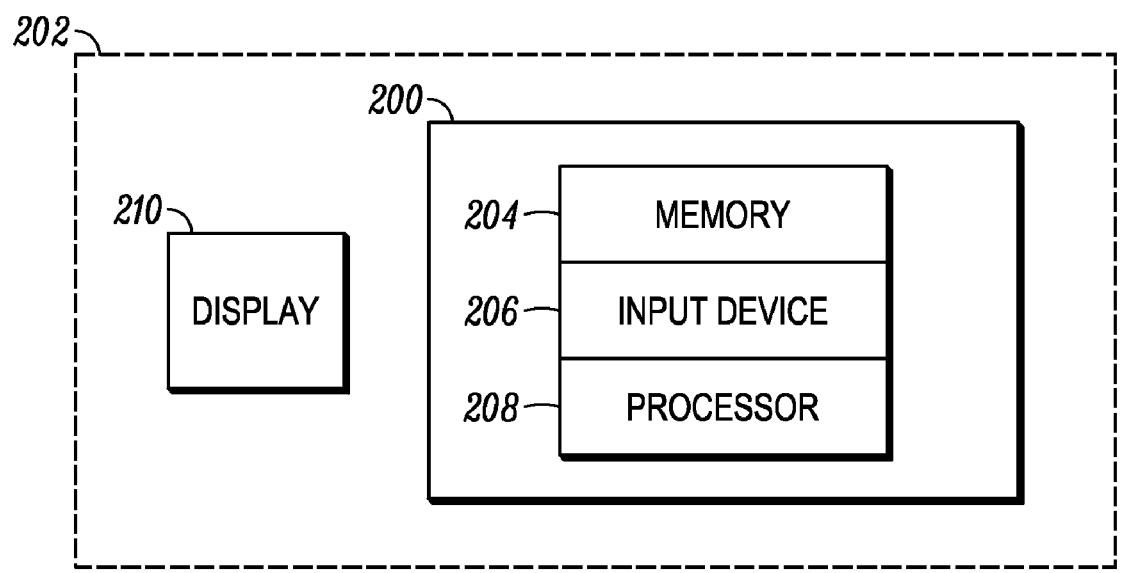
FIG. 2 is a schematic representation of a system for constructing offsets from a flight plan in accordance with an exemplary embodiment of the present invention.

Referring to FIG. 2, a system 200 is illustrated for constructing a flight plan and offsets from the flight plan for an aircraft. The system 200 can be a stand-alone system, integrated with another system, and/or can be a stand-alone system configured to communicate with another system. In addition, the system 200 can be configured for constructing the flight plan and offsets from the flight plan for any number of aircraft in any number of applications. In the illustrated embodiment, the system 200 is integrated with a Flight Management System (FMS) 202 and can be configured for constructing a flight plan and offsets from the flight plan of a commuter, long range, wide body jet airplane, and other types of aircraft.

The system 200 can include a memory 204 that is configured to store data associated with multiple waypoints that can be used in constructing the flight plan and offsets from the flight plan. The data can be any information associated with a waypoint, which as used herein refers to a uniquely identified latitude and longitude location or point. The data can be originally stored in the memory 204 and can be subsequently updated with any number of memory storage and memory updating techniques known in the art.

The system 200 can also include an input device 206 that enables a user to input a starting point and an ending point for the flight plan, as well as any other information related to the flight plan and offsets from the flight plan. The input device 206 can be any device suitable for accepting input from a user of the system 200, such a touch-pad, joystick, mouse, trackball, or keyboard.

The system 200 can further include a processor 208 that can include any number of microprocessors, memories, storage devices, interfaces, and other processor components. The processor 208 is configured to access data in the memory 204 and selectively retrieve data related to the waypoints along the flight plan.

The system 200 may also include, or be configured to be coupled to, at least one display 210. The display 210 can be any current or future display that is suitable for producing a visual representation of the flight plan. For example, the display 210 can be a color or monochrome cathode ray tube (CRT) display, liquid crystal display (LCD), plasma display, electro-luminescent display, vacuum fluorescent display, heads-up display, heads-down display, helmet mounted display, light emitting diode display, or the like. The display 210 can include a Graphical User Interface (GUI).

Figure 1:
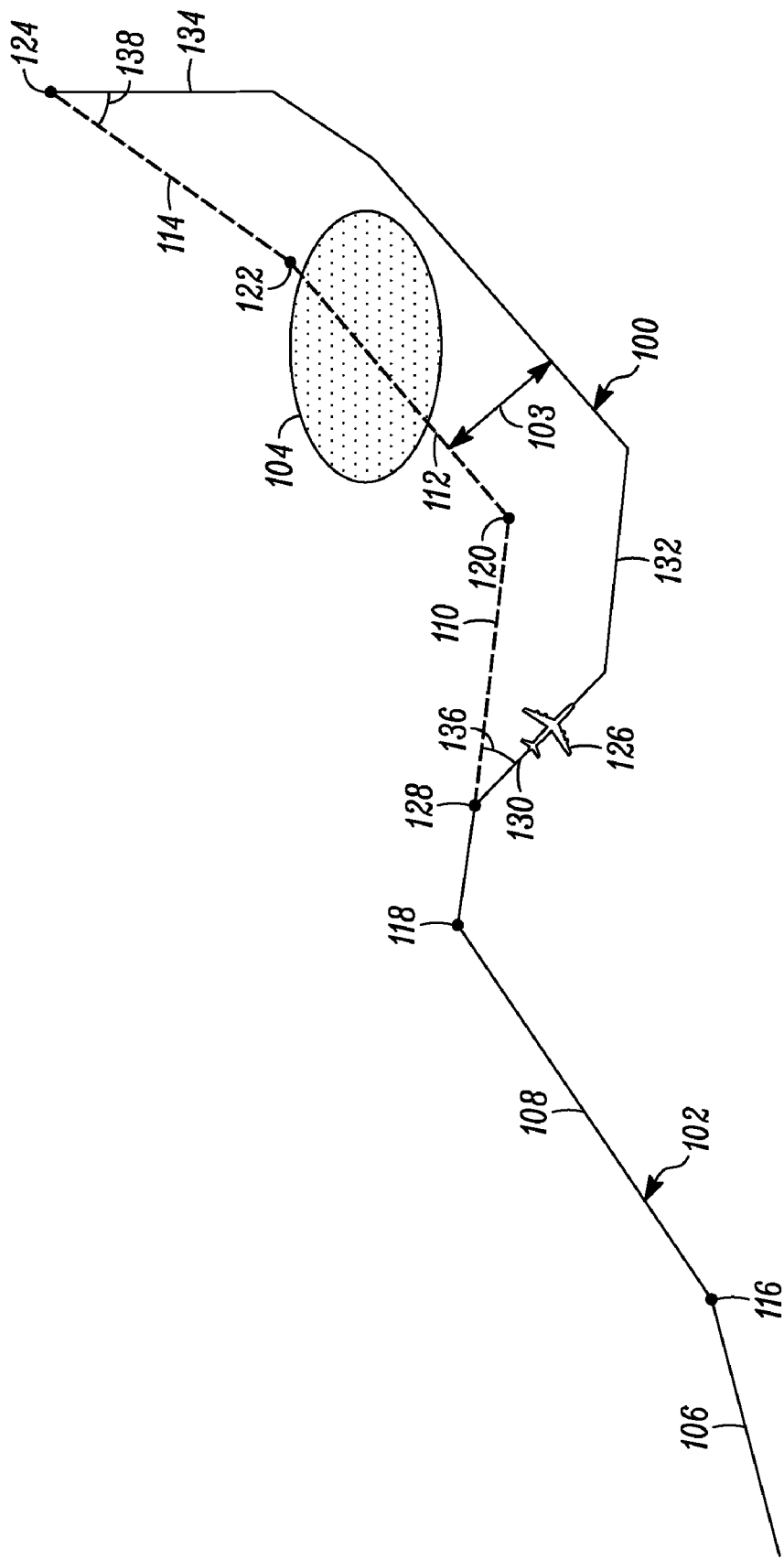
FIG. 1 is an illustration of a conventional offset from a flight plan.
Figure 3:
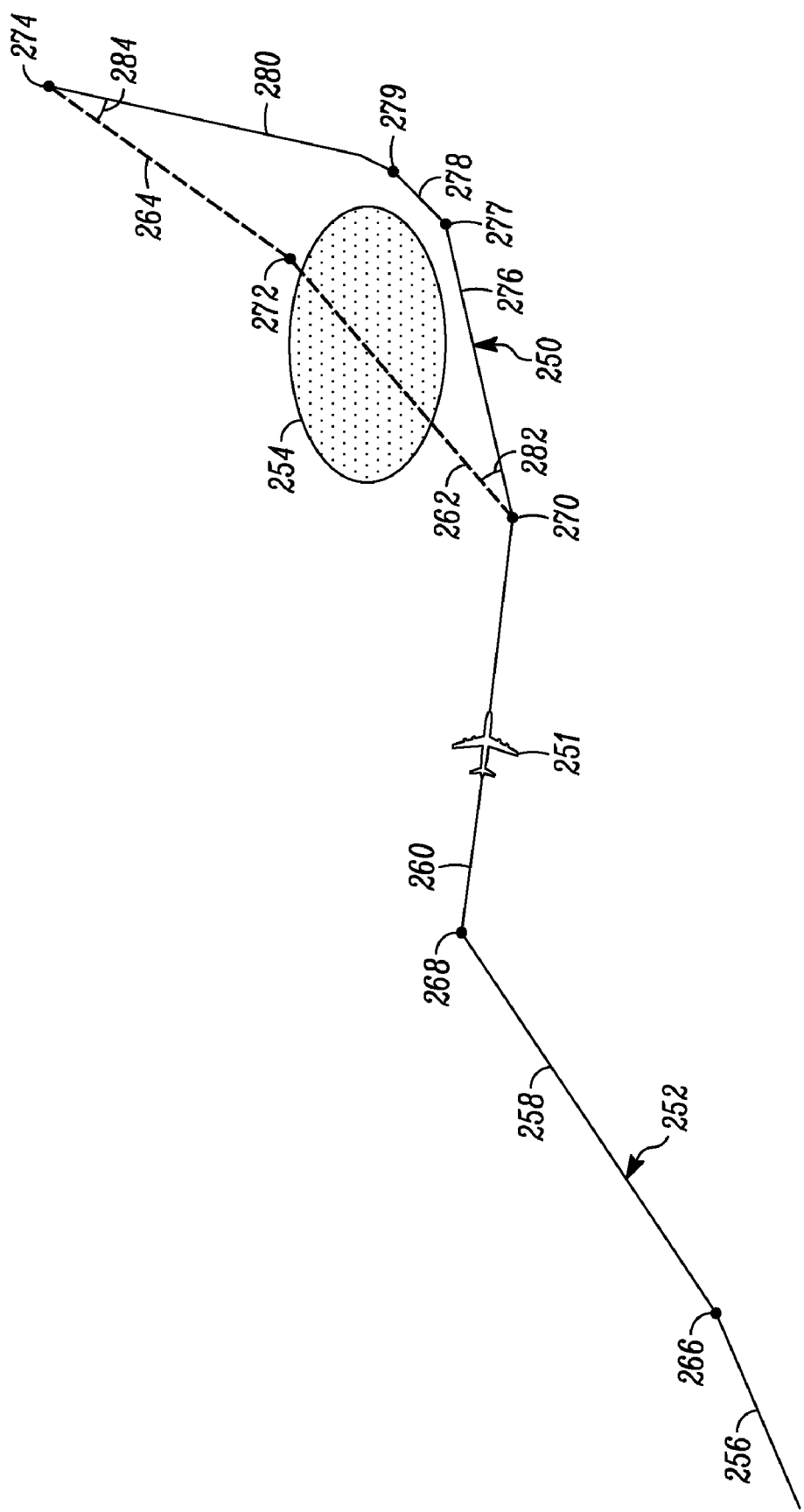
FIG. 3 is an illustration of an offset from a flight plan constructed in accordance with an exemplary embodiment of the present invention.

Referring to FIG. 3, the system 200 constructs an offset 250 in accordance with an exemplary embodiment. The offset 250 is a modification to a flight plan 252 in which a parallel flight path is constructed at an offset distance either to the left or the right of the flight plan 252. As noted above, the offsets 250 are primarily used by aircraft 251 to avoid terrain obstacles, weather, or traffic 254. In the example shown in FIG. 3, the flight plan 252 includes five legs 256, 258, 260, 262, and 264 that connect five waypoints 266, 268, 270, 272, and 274. The offset 250 begins at the third waypoint 270 and includes a capture path 276, a parallel path 278, and a return path 280. The capture path 276 ends at a capture path end point 277, and the return path 280 begins at a return path start point 279. Contrary to the offset 100 shown in FIG. 1, the offset 250 in accordance with an exemplary embodiment of the present invention has a variable capture angle 282 and a variable return angle 284. The capture angle 282 and return angle 284 can be, for example, between 10° and 50°.

FIGS. 4-11 demonstrate the construction of an offset 350 from a flight plan 300 in accordance with an exemplary embodiment of the present invention. As shown in FIG. 4, an offset start point 316 is selected on a first leg 302 of the flight plan 300 that includes three legs 302, 304, and 306 and four waypoints 308, 310, 312, and 314. The offset start point 316 can be any point on the flight plan 300 and can be selected by the pilot. For example, offset start point 316 can be the current aircraft position or any downpath waypoint such as waypoints 308, 310, 312, and 314. If the offset start point 316 is the current aircraft position, a capture point is placed on the aircraft track at a large enough distance to turn onto the proper capture angle at a smooth transition. A first bisector 318 is established on the second waypoint 310 between the first leg 302 and the second leg 304.

As shown in FIG. 5, a first capture path angle 322 for a first capture path segment 321 of a capture path 320 is selected, for example, by the pilot. The first capture path angle 322 can vary, for example, between 10° and 50° from the first leg 302 at the offset start point 316.

As shown in FIG. 6, it is then determined whether the first capture path segment 321 intersects with an offset distance 326 prior to the bisector 318. The offset distance 326 can be, for example, selected by a pilot. As shown in FIG. 7, this can be done, for example, by establishing a first offset backcourse 328 at the offset distance 326 and parallel to the first leg 302, and determining whether the first capture path segment 321 intersects the first offset backcourse 328 prior to intersecting the first bisector 318. If the first capture path segment 321 intersects the first offset backcourse 328 prior to the first bisector 318, the intersection becomes a capture path end point (not shown), and the capture path 320 is complete and the offset proceeds to the parallel path 348 (see FIG. 11) that is parallel and at the offset distance 326 to the flight plan 300 until returning to the flight plan 300 on a return path. A further explanation of calculating a return path for the offset 350 is discussed in further detail below with reference to FIGS. 12 and 13.

Figure 10:
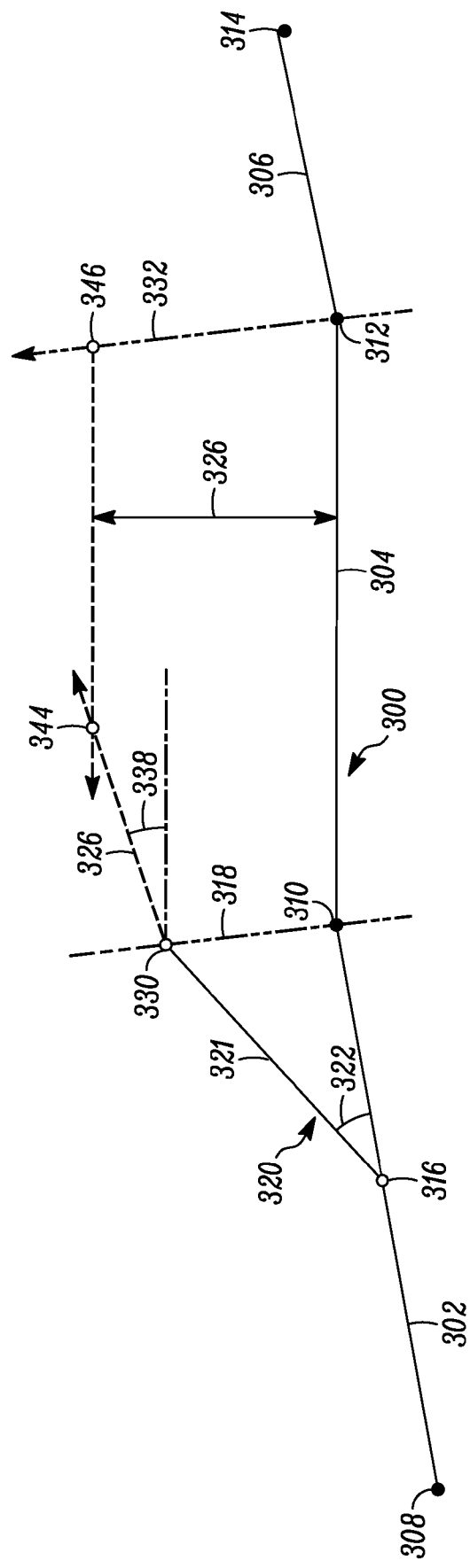
Figure 11:
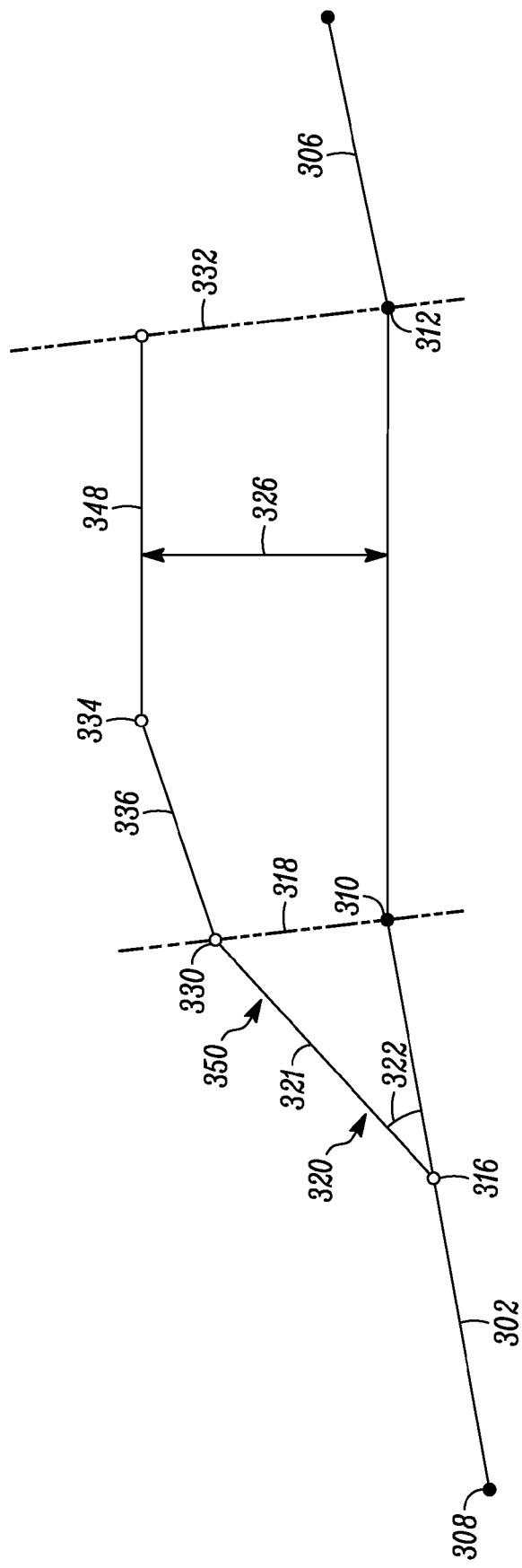

If, as shown in FIG. 8, the first capture path segment 321 intersects the first bisector 318 prior to intersecting the first offset backcourse 328, the intersection between the first capture path segment 321 and the bisector 318 is designated as a first offset to point 330 and the first capture path segment 321 is complete. The remaining capture path segments of the capture path 320 are then calculated. In general, the steps above are repeated until a capture path segment intersects an offset backcourse before a bisector. As an example, as shown in FIG. 9, a second capture path segment 336 from the first offset to point 330 extends at a second capture path angle 338. The second capture path angle 338 is typically the same as the first capture path angle 322 and be, for example, between 10° and 50°. As in the determination of the first capture path segment 321, a second bisector 332 and a second bisector backcourse 342 at the offset distance 326 from the flight plan 300 are established, as shown in FIG. 10. It is then determined whether the second capture path segment 336 intersects the second bisector backcourse 342 before intersecting the second bisector 332. In the example illustrated in FIG. 10, the second capture path segment 336 intersects the second bisector 342, and the intersection is designated as the capture path end point 344. The capture path 320 is now complete, and as shown in FIG. 11, the capture path 320 of the offset 350 transitions to the parallel path 348, which tracks the flight plan 300 at the offset distance 326. If the second capture path segment 336 had intersected the second bisector 332 instead of the second bisector backcourse 342 in FIG. 10, a third capture path segment (not shown) would have been constructed, and additional capture path segments would be established until the capture path segment intersected the bisector backcourse.

Referring to FIG. 12, a return path 400 from a parallel path 402 of an offset 404 to a flight plan 406 is constructed in a manner similar to the construction of the capture path 320 of FIGS. 4-11. For example, FIG. 12 illustrates pre-planned return path 400 from a current aircraft position. In the illustrated embodiment, a first leg 408 and a second leg 410 of the flight plan 406 are shown, and a first parallel path segment 412 and a second parallel path segment 414 of the offset 404 are shown. The return path 400 is constructed from a return path end point 416, which is also a waypoint. A first return path segment 418 extends from the return path end point 416 at a first return path angle 420. The first return path angle 420 can be any angle, for example, between 10° and 50°. The first return path angle 420 can be selected, for example, by the pilot. It is then determined whether the first return path segment 418 intersects the first parallel path segment 412 of the offset 402 prior to intersecting a bisector 422 between the first leg 408 and the second leg 410. If the first return path segment 418 intersects with the first parallel path segment 412 of the offset 402, then that intersection is designated as the return path start point 424, as shown in FIG. 12, and the first return path segment 418 is designated as the complete return path 400.

If, in FIG. 12, the first return path segment 418 intersects with the bisector 422 prior to the first parallel path segment 412, the intersection between the first return path segment 418 and the bisector 422 is established as a first offset from point (not shown) for the return path 400. The steps above are repeated to provide one or more additional return path segments from the first offset from point (not shown).

FIG. 13 illustrates an alternate return path 450 in accordance with an exemplary embodiment of the invention for a flight plan 452 that includes three legs 454, 456, and 458 and three waypoints 460, 462, and 464. For example, FIG. 13 illustrates an immediate return path 450. The return path 450 originates from a present position (PPOS) 463 at a first return angle 466. In this embodiment, it is determined whether a first return path segment 468 intersects the first leg 454 or a first bisector 470 at the second waypoint 462 between the first leg 454 and the second leg 456. If the first return path segment 468 intersects the first leg 454, the first return path segment 468 is established as the complete return path 450. However, as shown in FIG. 13, if the first return path segment 468 intersects the first bisector 470, the intersection is established as a first offset from point 472 and a second return path segment 474 extends from the first offset from point 472 at a second return path angle 476. It is then determined whether the second return path segment 474 intersects the second leg 456 or a second bisector 478 at the third waypoint 464 between the second leg 456 and the third leg 458. In the illustrated embodiment, the second return path segment 474 intersects the second leg 456 at a capture path end point 480, and the return path 450 is established as the first return path segment 468 and the second return path segment 474. If the second return path segment 474 had intersected the second bisector 478, the intersection would be established as a second offset from point (not shown) and a third offset path segment (not shown) would be determined. Additional return path segments are determined until a return path segment intersects the return path.

Figure 15:
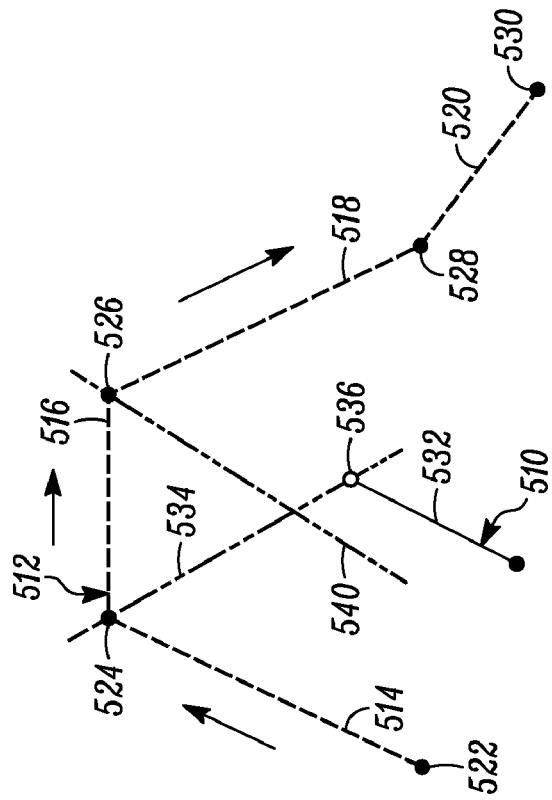
FIGS. 15-18 are illustrations demonstrating the construction of an offset from a flight plan with a course reversal in accordance with another exemplary embodiment of the present invention.
Figure 14:
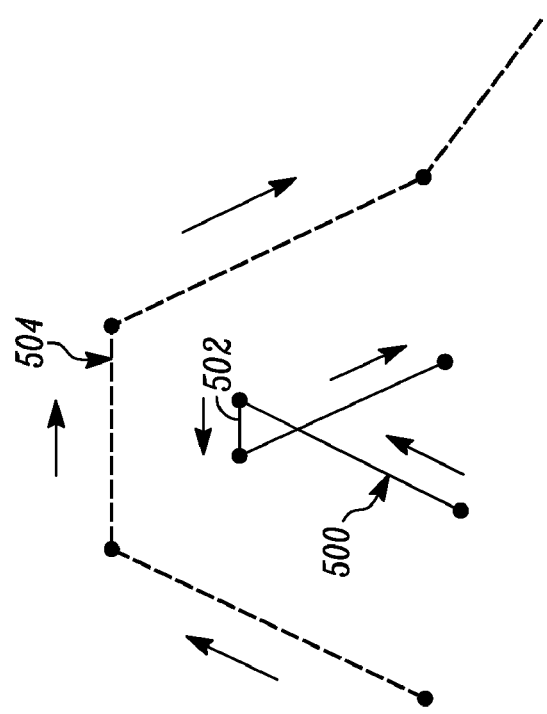
FIG. 14 is an illustration of an offset from a flight plan with a course reversal.
Figure 17:
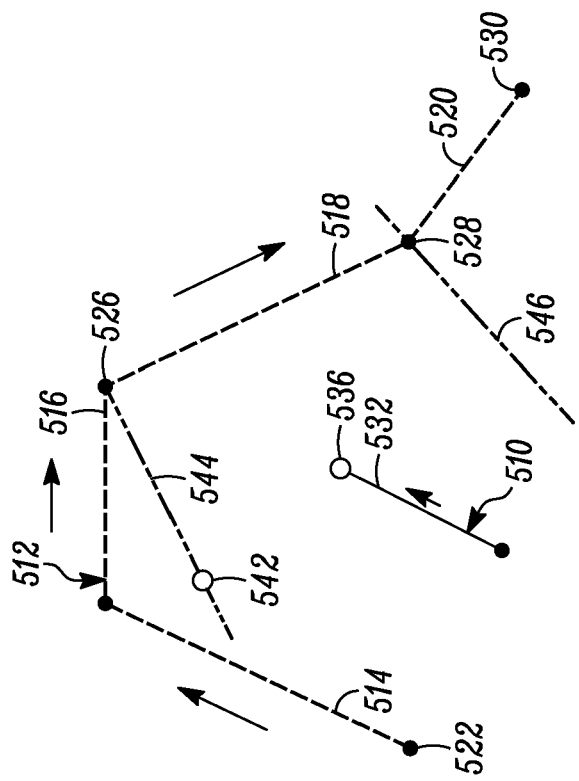
Figure 16:
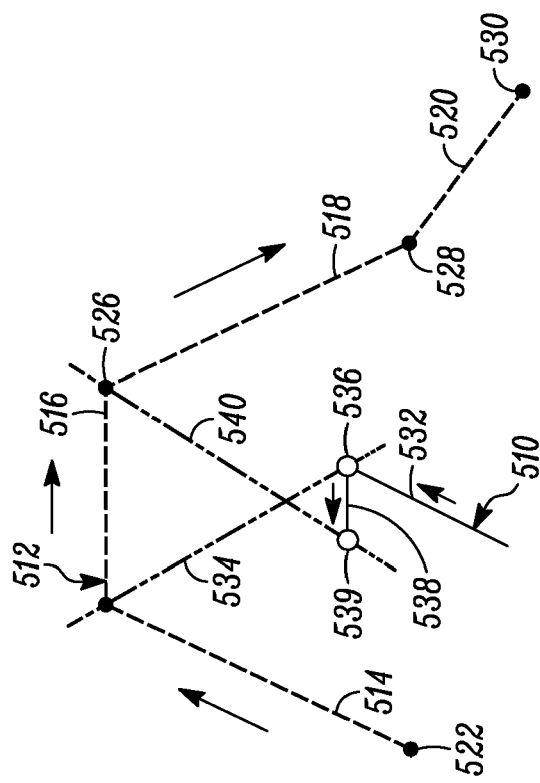
Figure 18:
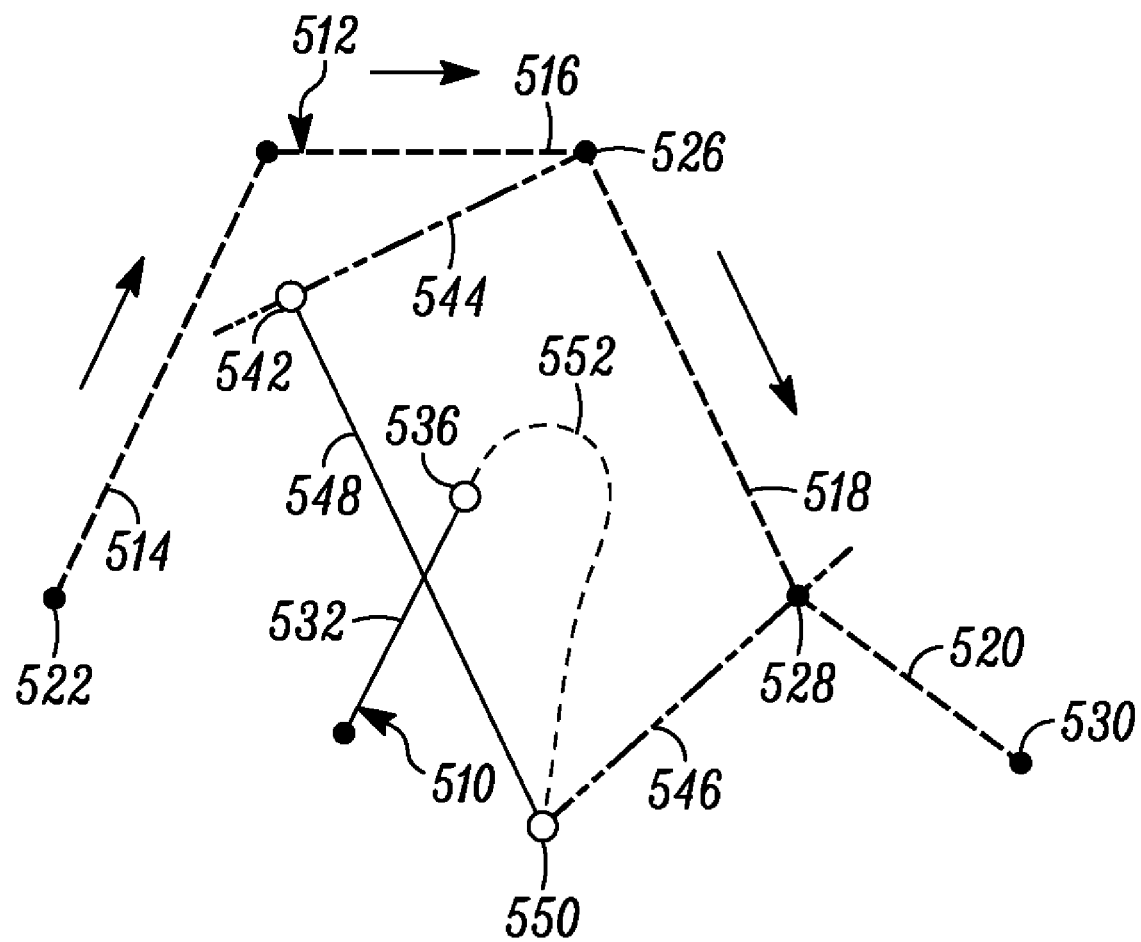

Exemplary embodiments of the present invention described above can be modified. For example, the offset construction described above results, in certain situations, in a course reversal, as shown in FIG. 14. In this case, an offset 500 constructed with the embodiment described above would result in at least one segment 502 that extends in a direction opposite of a corresponding leg of the flight plan 500. The reversed segment 502 detracts from the efficiency of the offset 504. In this situation, exemplary embodiments of the present invention can remove segments of the calculated offset 500 to improve the efficiency of the offset 500. One such exemplary embodiment is illustrated in FIGS. 15-21. As shown in FIG. 15, an offset 510 is constructed with respect to a flight plan 512 having four legs 514, 516, 518, and 520 and five waypoints 522, 524, 526, 528, and 530. In this embodiment, as in the embodiment referenced in FIGS. 4-11, it is determined whether a first capture path segment 532 intersects a first bisector 534 between the first leg 514 and the second leg 516 prior to a first offset backcourse (not shown). In this case, the first capture path segment 532 intersects the first bisector 534 prior to the first offset backcourse (not shown) and the intersection between the bisector 534 and the first capture path segment 532 is designated the first offset to point 536 for the offset 510. However, as shown in FIG. 16, when calculating a second capture path segment 538, i.e., the determination of a path from the first offset to point 536 to a second bisector 540 at a second offset to point 539, it may be determined that the calculated second capture path segment 538 is an opposite direction with respect to the flight plan 512, particularly the second leg 516 of the flight plan 512. In this situation, the second bisector 540 and the second capture path segment 538 are ignored, and a third offset to point 542 is established, as shown in FIG. 17. The third offset to point 542 is established on a first abeam line 544 from the third waypoint 526 between the second leg 516 and the third leg 518 and perpendicular to the third leg 518. The third offset to point 542 is positioned on the first abeam line 544 at an offset distance from the third waypoint 526. The offset distance can be selected, for example, by the pilot. Next, a third bisector 546 is established at the fourth waypoint 528 between the third leg 518 and the fourth leg 520. As shown in FIG. 18, a third capture path segment 548 is then determined. The third capture path segment 548 extends from the third offset to point 542 to an intersection with the third bisector 546. If, as in FIG. 18, the third capture path segment 548 intersects the third bisector 546, the intersection is established as a fourth offset to point 550. Due to the disconnect between the first capture path segment 532 and the third capture path segment 548, guidance of the FMS constructs a transition 552 from the end of the first capture path segment 532 at the first offset to point 536 to the third capture path segment 548. For example, guidance of the FMS constructs the transition in the same manner as constructing transitions across disconnects between two legs. Additional capture path segments are then constructed in accordance with the embodiments discussed above.

Figure 19:
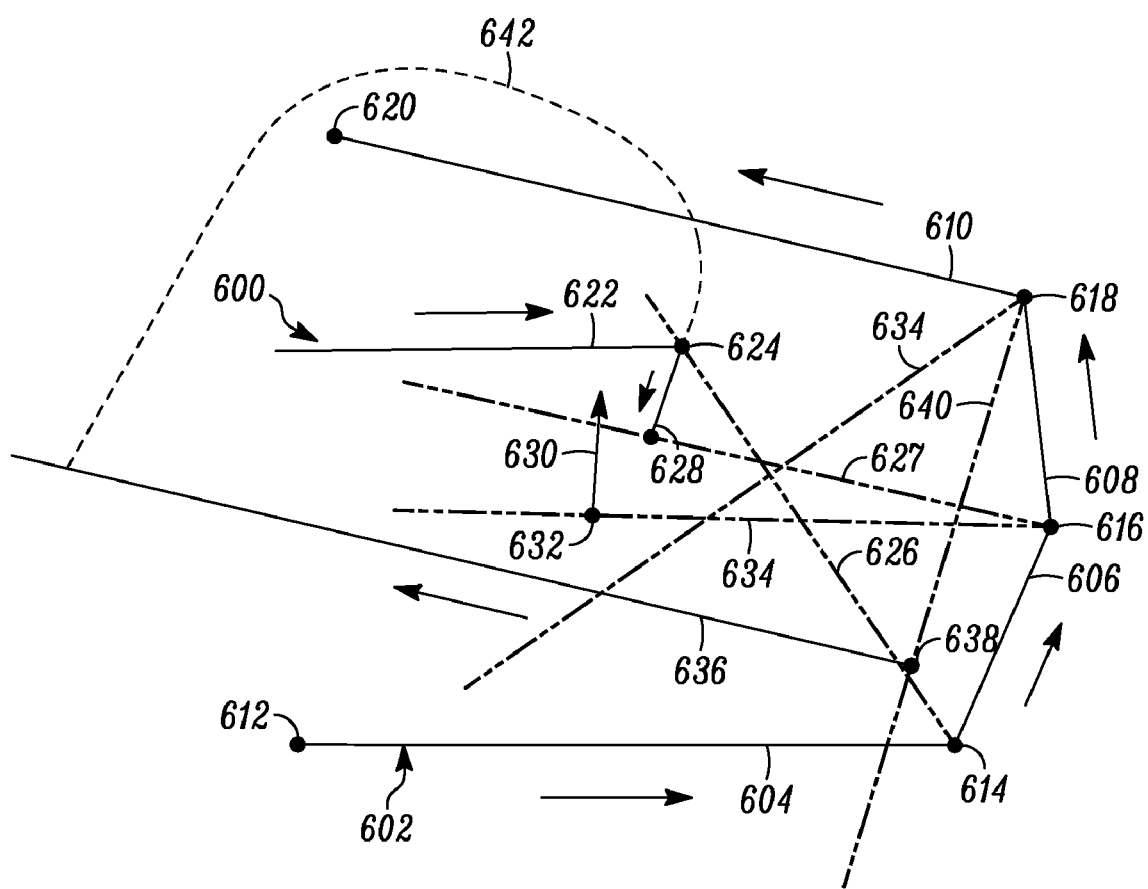
FIG. 19 is an illustration demonstrating the construction of an offset from a flight plan with multiple consecutive course reversals in accordance with another exemplary embodiment of the present invention.

FIG. 19 is an example of an embodiment in which the offset construction discussed above in reference to FIGS. 4-11 may result in more than one offset segment that needs to be removed to improve the efficiency of the offset. In FIG. 19, an offset 600 is constructed for a flight plan 602 that includes four legs 604, 606, 608, and 610 that connect five waypoints 612, 614, 616, 618, and 620. In this example, a first offset segment 622 of the offset 600 ends at a first offset to point 624 on a first bisector 626, and a subsequently calculated second offset segment 628 on a second bisector 627 leads to a course reversal, particularly with respect to the second leg 606. As such, the calculated second offset segment 628 is removed. Accordingly, utilizing the embodiments discussed above in reference to FIGS. 15-18, a third offset segment 630 extends from a second offset to point 632 that lies on a first abeam 634 at the third waypoint 616 that is perpendicular to third leg 608. In accordance with the embodiments above, it is determined whether the third offset segment 630 intersects a third bisector 634 from the fourth waypoint 618 between the third leg 608 and the fourth leg 610 or a bisector backcourse (not shown) extending from the third bisector 634 at an offset distance. In this instance, the third offset segment 630 does not intersect with either the third bisector 634 or the bisector backcourse (not shown) extending from the third bisector 634 at an offset distance. As such, the third offset segment 630 is also removed in this embodiment, and a fourth offset segment 636 starts at a third offset to point 638 on a second abeam 640 at the fourth waypoint 618 that is perpendicular to the fourth leg 610. As in the embodiment of discussed in reference to FIGS. 15-18, guidance will construct a transition 642 from the first offset segment 622 to the fourth offset segment 636.

In the exemplary embodiments discussed above with reference to FIGS. 15-19, one or more segments of an offset that extend in an opposite direction to the flight plan can be removed. However, when a waypoint is on a pole, the offset construction can result in a segment that only apparently extends in an opposite direction. To account for this special consideration, the coordinates of the polar waypoint can be adjusted slightly to ensure that the proper offset is provided. The coordinates of the polar waypoint can be modified, for example, by 0.17 km (0.09 nm).

Figure 20:
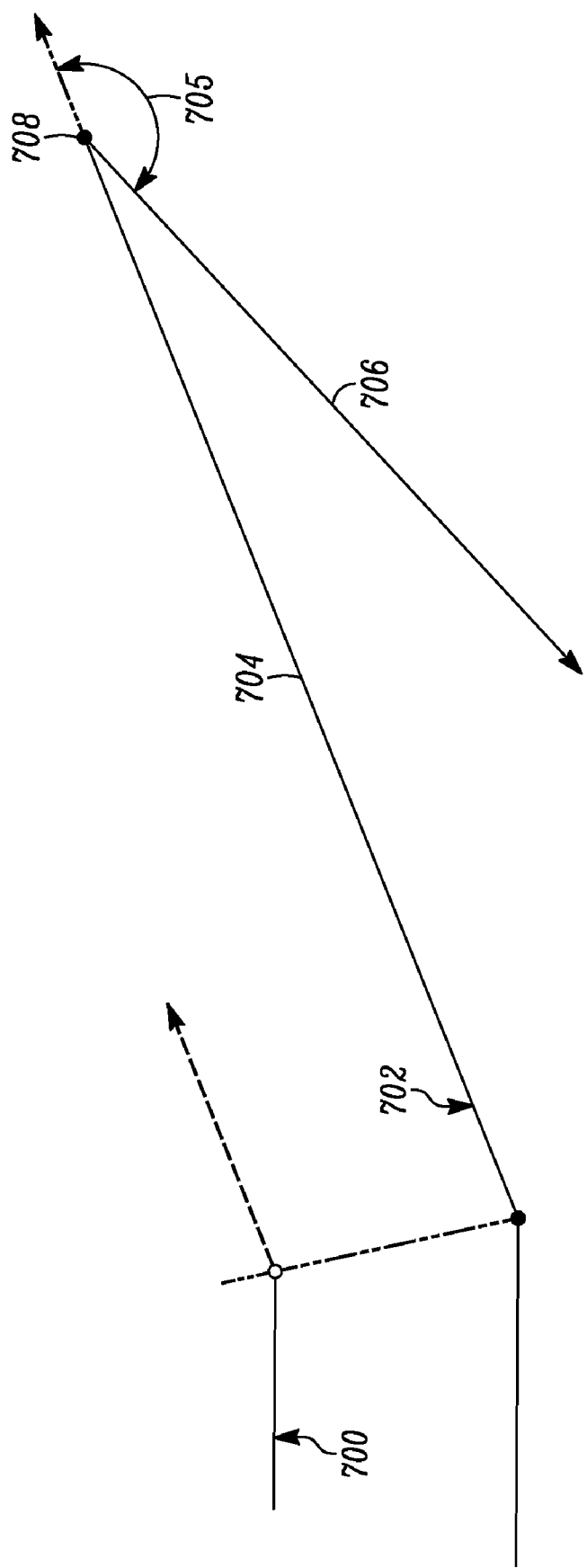
FIGS. 20-22 are illustrations demonstrating the construction of an offset from a flight plan with a large course change in accordance with an exemplary embodiment of the present invention.
Figure 21:
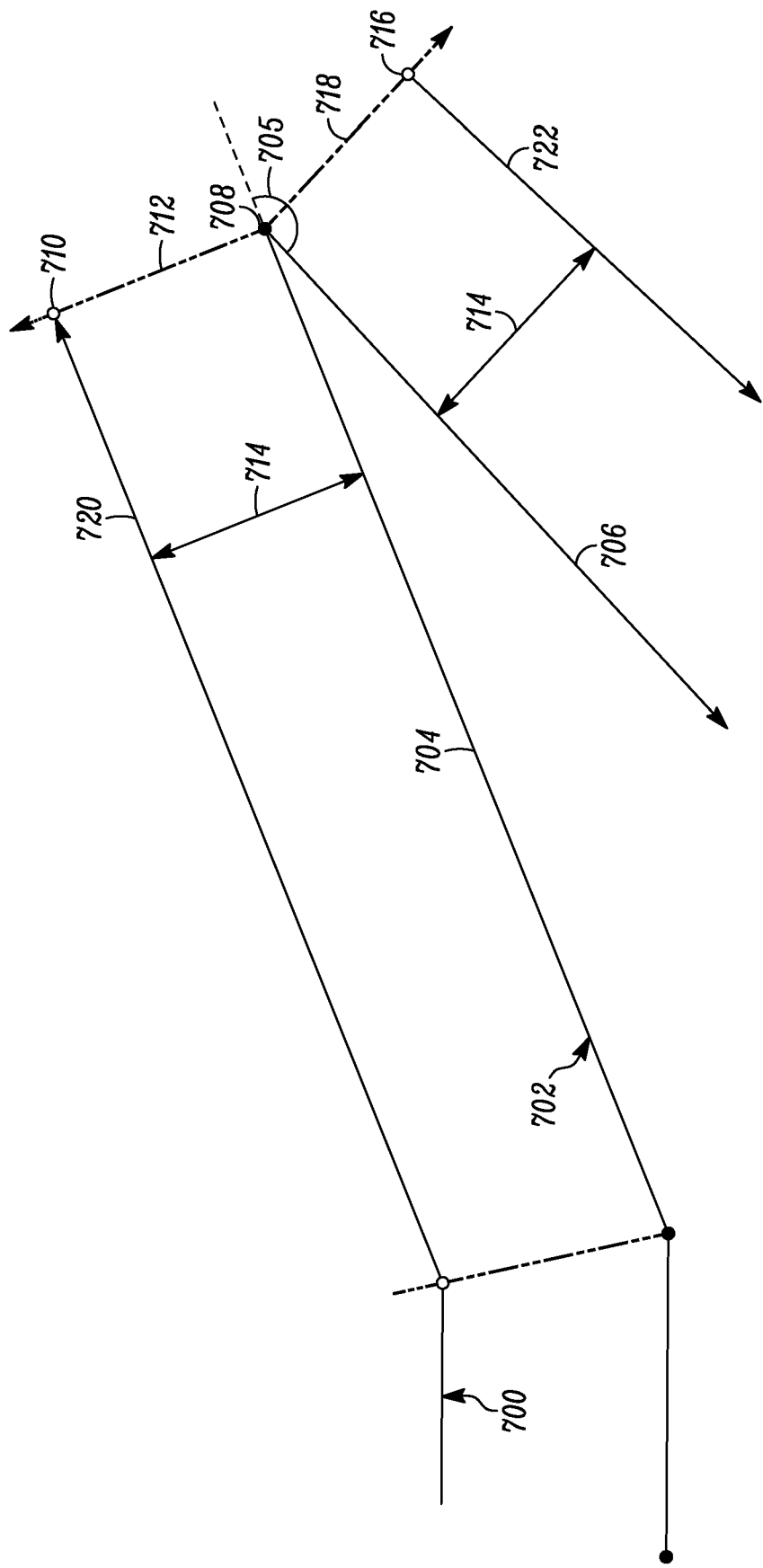
Figure 22:
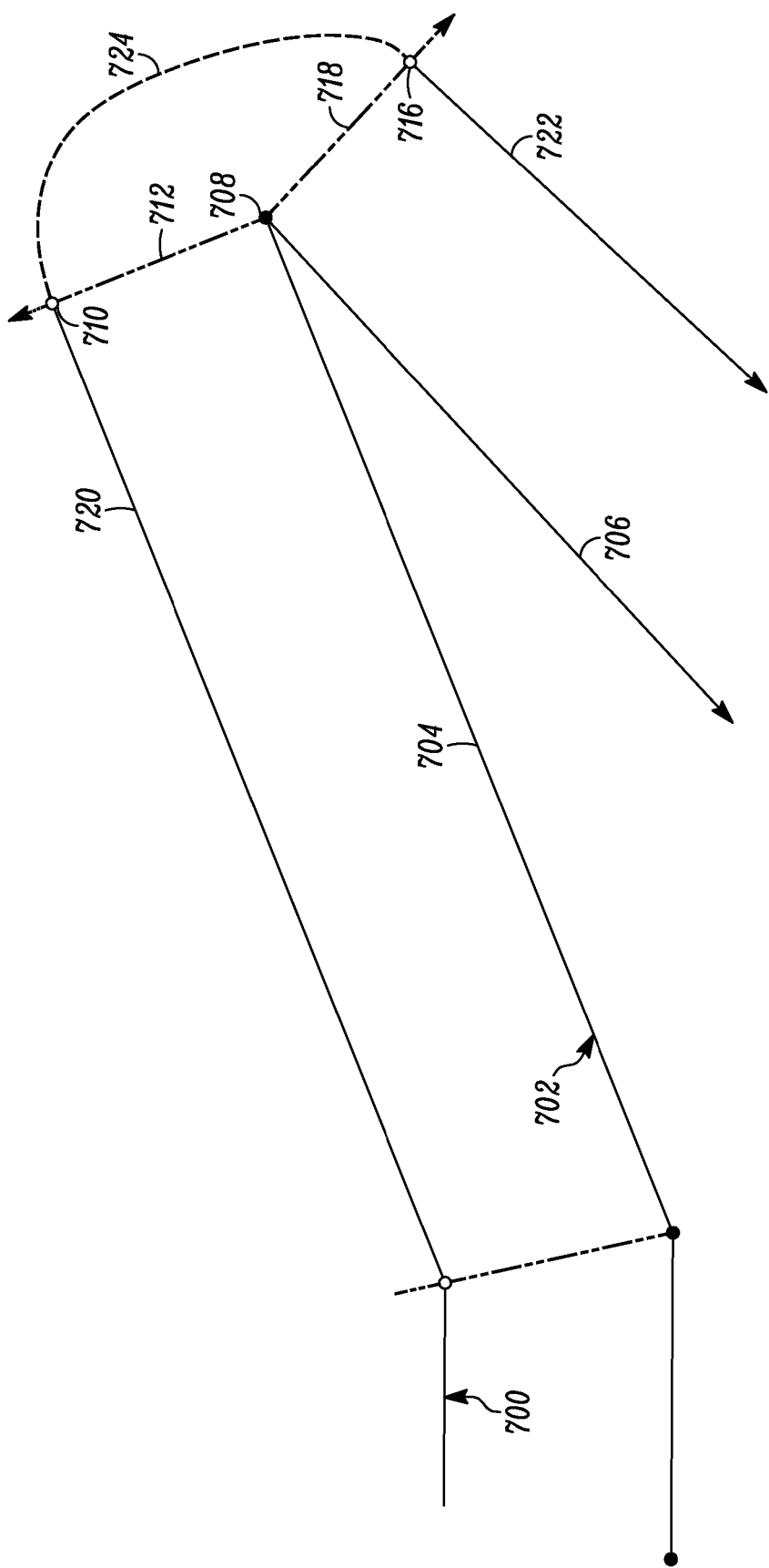

FIGS. 20-22 is an example of one exemplary embodiment in which the construction of an offset 700, otherwise calculated as discussed above, encounters a flight plan portion 702 having a relatively large course change 705 between a first leg 704 and a second leg 706 at a waypoint 708. The large course change 705 can be, for example, greater than 150°. In these situations, the large course change 705 can be detected and considered in constructing the offset 700. As shown in FIG. 21, a first offset to point 710 is established at an offset distance 714 on an abeam 712 extending from the waypoint 708 perpendicular to the first leg 704. Similarly, a second offset to point 716 is established at the offset distance 714 on an abeam 718 extending from the waypoint 708 perpendicular to the second leg 706. A first offset segment 720 is established to the first offset to point 710, and a second offset segment 722 is established from the second offset to point 716. Guidance in the system 200 (FIG. 2) can the construct a conventional transition 724 between the first and second offset to points 710 and 716 to connect the first and second offset segments 720 and 722, as shown in FIG. 22.

Figure 23:
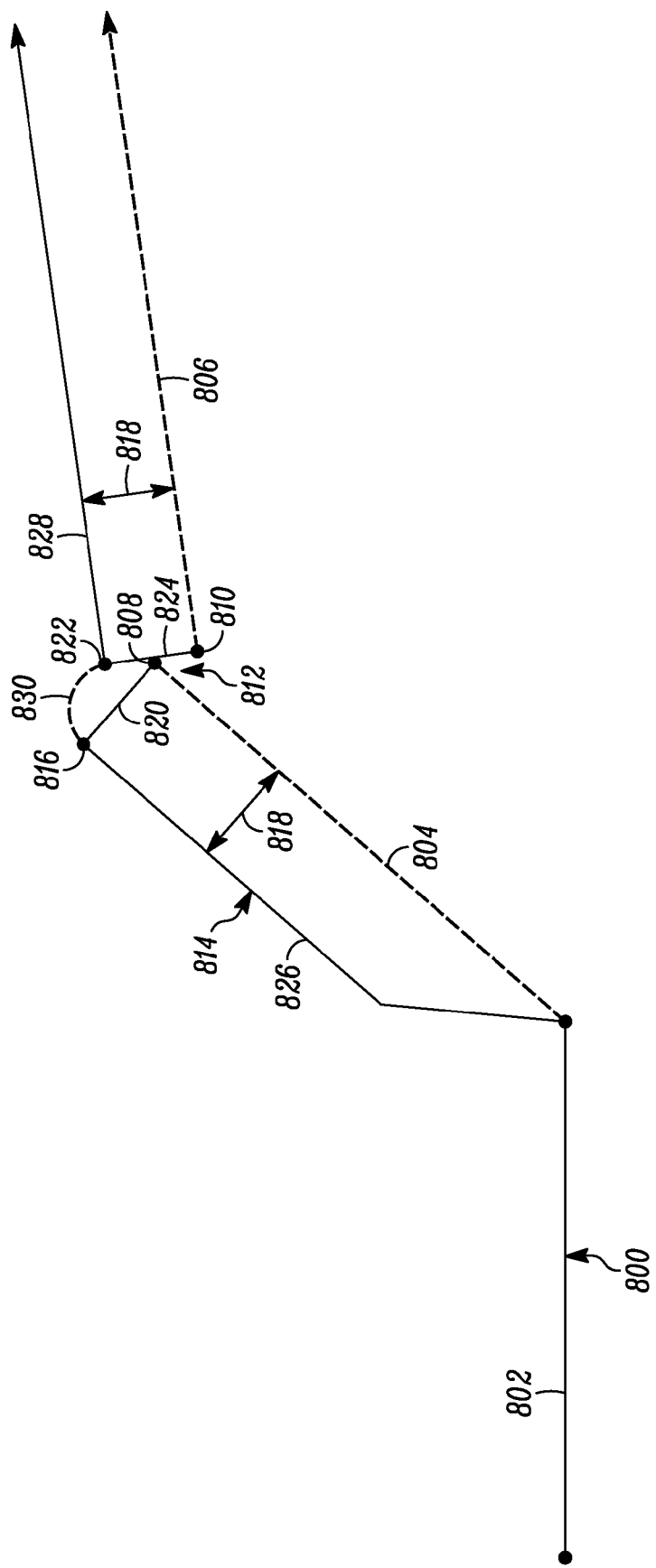
FIG. 23 is an illustration demonstrating the construction of an offset from a flight plan with a disconnect between legs in accordance with an exemplary embodiment of the present invention.

In some situations, the legs of the flight plan may also have one or more discontinuities. As an example, FIG. 23 illustrates a flight plan 800 that includes three legs 802, 804, and 806. The second leg 804 ends a first waypoint 808, and the third leg 806 begins at a second waypoint 810 to create a discontinuity 812 between the first waypoint 808 and the second waypoint 810. In one embodiment, the discontinuity 812 can be detected and considered when constructing an offset 814. A first offset to point 816 is established at an offset distance 818 on a first abeam 820 extending from the first waypoint 808 perpendicular to the first leg 804. Similarly, a second offset to point 822 is established at the offset distance 818 on a second abeam 824 extending from the second waypoint 810 perpendicular to the second leg 806. A first offset segment 826 is established to the first offset to point 816, and a second offset segment 828 is established from the second offset to point 822. Guidance in the system 200 (FIG. 2) can the construct a conventional transition 830 between the first and second offset to points 816 and 822 to connect the first and second offset segments 826 and 822.

Accordingly, methods and systems have been provided for constructing offsets from flight plans that minimize deviation from original flight plans and increase the efficiency of the offset. Moreover, methods and systems have been provided for constructing offsets from flight plans that enable pilot modifications, including variable capture and return angles. Additionally, systems and methods have been provided for constructing offsets from flight plans that traverse multiple legs, non-intersecting legs, and large course changes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for constructing an offset at an offset distance from a flight plan with a plurality of legs and a plurality of waypoints for flight by an aircraft, the system comprising:
    an input device configured to receive inputs related to a capture path angle and a capture path start point from a pilot;
    a memory coupled to the input device and configured to store data related to the flight plan and the offset; and
    a processor configured to retrieve data from the memory and to construct the offset based on the capture path angle and the capture path start point for flight by the aircraft,
    wherein the offset includes a capture path, a parallel path, and a return path, and
    wherein the processor is further configured to determine whether a first capture path segment extending from the capture path start point on the first leg at the first capture path angle intersects a) a first bisector extending from a first waypoint between the first leg and a second leg or b) a first bisector backcourse extending from the first bisector parallel to the first leg at the offset distance;
    wherein the processor is further configured to establish, if the first capture path segment first intersects the first bisector backcourse, the first capture path segment as the capture path.

2. The system of claim 1, wherein the capture path angle is between 10° and 50°.

3. The system of claim 1, wherein the capture path angle is variable.

4. The system of claim 1, wherein the processor is further configured to construct the parallel path from the capture path.

5. The system of claim 1, wherein the processor is further configured to construct constructing the return path from the parallel path to the flight plan.

6. A system for constructing an offset at an offset distance from a flight plan with a plurality of legs and a plurality of waypoints for flight by an aircraft, the system comprising:
- an input device configured to receive inputs related to a capture path angle and a capture path start point from a pilot;
- a memory coupled to the input device and configured to store data related to the flight plan and the offset; and
- a processor configured to retrieve data from the memory and to construct the offset based on the capture path angle and the capture path start point for flight by the aircraft,
- wherein the offset includes at least a capture path and a return path,
- wherein the processor is further configured to determine whether a first capture path segment extending from the capture path start point on the first leg at the first capture path angle intersects a) a first bisector extending from a first waypoint between the first leg and a second leg or b) a first bisector backcourse extending from the first bisector parallel to the first leg at the offset distance;
- wherein the processor is further configured to establish, if the first capture path segment first intersects the first bisector backcourse, the first capture path segment as the capture path; and
- wherein the processor is further configured to establish, if the first capture path segment first intersects the first bisector, the intersection as a first point; to determine one or more subsequent capture path segments until the one or more subsequent capture path segments first intersect a subsequent bisector backcourse instead of a subsequent bisector; and to establish the first capture path segment and the one or more subsequent capture path segments as the capture path.

7. The system of claim 6, wherein the processor is further configured to
- detect a course change between a third leg and a fourth leg of at least 150° at a second waypoint;
- establish a second point at the offset distance on a first abeam line extending from the second waypoint perpendicular to the third leg and a third point at the offset distance on a second abeam line extending from the second waypoint perpendicular to the fourth leg;
- construct a second capture path segment to the second point and a third capture path segment from the third point; and
- construct a transition between the second point and the third point.

8. The system of claim 6, wherein the processor is further configured to
- detect a discontinuity between a third leg that ends on a second waypoint and a fourth leg that starts on a third waypoint;
- establish a second point at the offset distance on a first abeam line extending from the second waypoint perpendicular to the third leg and a third point at the offset distance on a second abeam line extending from the third waypoint perpendicular to the fourth leg;
- construct a second capture path segment to the second point and a third capture path segment from the third point; and
- construct a transition between the second point and the third point.

9. The system of claim 6, wherein the processor is further configured to determine the one or more subsequent capture path segments with a selected second capture path angle for a second capture path segment.

10. The system of claim 6, wherein the processor is further configured to construct the return path with a selected return path end point on a second leg and a first return path angle from the second leg.

11. The system of claim 10, wherein the processor is further configured to
- determine whether a first return path segment extending from the return path end point on a third leg at the first capture path angle intersects a) a second bisector extending from a second waypoint between the third leg and a fourth leg or b) a first parallel path segment that is parallel to the third leg;
- establish, if the first return path segment first intersects the first parallel path segment, the first return path segment as the return path;
- establish, if the first return path segment first intersects the second bisector, the intersection as a second point; determine one or more subsequent return path segments until the one or more subsequent return path segments intersect a previous parallel path segment instead of a bisector; and establish the first return path segment and the one or more subsequent return path segments as the return path.

12. The system of claim 11, wherein the processor is further configured to construct the return path includes selecting the first return path angle as a variable angle.

13. The system of claim 11, wherein the processor is further configured to construct the return path in which the first return path angle is between 10° and 50°.

14. The system of claim 11, wherein the processor is further configured to determine one or more subsequent return path segments includes selecting a second return path angle for a second return path segment.

15. The system of claim 11, wherein the return path includes a return path start point on a parallel path segment of the parallel path and a first return path angle from the parallel path segment.

16. The system of claim 15, wherein the processor is further configured to
- determine whether a first return path segment extending from the return path start point first intersects a) a second bisector extending from a second waypoint between a third leg and a fourth leg of the flight plan or b) the third leg;
- establish, if the first return path segment first intersects the third leg, the first return path segment as the return path;
- establish, if the first return path segment first intersects the second bisector, the intersection as a second point; determine one or more subsequent return path segments until the one or more subsequent return path segments intersect a second subsequent leg instead of a subsequent bisector; and establish the first return path segment and the one or more subsequent return path segments as the return path.

17. The system of claim 11, wherein the processor is further configured to
- detect a course change between a third leg and a fourth leg of at least 150° at a second waypoint;
- establish a second point at the offset distance on a first abeam line extending from the second waypoint perpendicular to the third leg and a third point at the offset distance on a second abeam line extending from the second waypoint perpendicular to the fourth leg;
- construct a second capture path segment to the second point and a third capture path segment from the third point; and utilize guidance to construct a transition between the second point and the third point.

18. The system of claim 11, wherein the processor is further configured to
- detect a discontinuity between a third leg that ends on a second waypoint and a fourth leg that starts on a third waypoint;
- establish a second point at the offset distance on a first abeam line extending from the second waypoint perpendicular to the third leg and a third point at the offset distance on a second abeam line extending from the third waypoint perpendicular to the fourth leg;
- construct a second capture path segment to the second point and a third capture path segment from the third point; and
- utilize guidance to construct a transition between the second point and the third point.

19. The system of claim 11, wherein the processor is further configured to detect a second capture path segment of the one or more subsequent capture path segments extending in a direction opposite to that of a corresponding leg, and to remove the second capture path segment.

* * * * *